(12) United States Patent
Dash

(10) Patent No.: US 7,370,136 B2
(45) Date of Patent: May 6, 2008

(54) EFFICIENT AND FLEXIBLE SEQUENCING OF DATA PROCESSING UNITS EXTENDING VLIW ARCHITECTURE

(75) Inventor: Dillip K. Dash, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 253 days.

(21) Appl. No.: 11/045,822

(22) Filed: Jan. 26, 2005

(65) Prior Publication Data
US 2006/0168433 A1 Jul. 27, 2006

(51) Int. Cl.
*G06F 15/00* (2006.01)
(52) U.S. Cl. .......................... 711/4; 712/241; 712/245; 712/24
(58) Field of Classification Search .................. 712/24, 712/241, 246, 245; 711/4
See application file for complete search history.

(56) References Cited

U.S. PATENT DOCUMENTS

| | | | | |
|---|---|---|---|---|
| 5,056,004 | A * | 10/1991 | Ohde et al. | 712/241 |
| 5,261,116 | A * | 11/1993 | Agrawal | 712/241 |
| 5,303,355 | A * | 4/1994 | Gergen et al. | 712/241 |
| 5,559,973 | A * | 9/1996 | Gallup et al. | 712/241 |
| 5,852,730 | A * | 12/1998 | Buss et al. | 712/241 |
| 5,909,559 | A * | 6/1999 | So | 710/307 |
| 6,170,051 | B1 * | 1/2001 | Dowling | 712/225 |
| 2003/0131204 | A1 * | 7/2003 | Lin et al. | 711/152 |

OTHER PUBLICATIONS

Author: Pezso Sima, Terence Fountain, Peter Kassuk, Title: Advanced Computer Architecture, Publisher: Addison-Wesley, Published in 1997, Relevant pp. 126, 283.*
Author: David A. Patterson, John L. Hennessy, Title: Computer Organization and Design (2nd Edition), Publisher: Morgan Kaufman, Published in 1998 Relevant p. 518.*
Author: John L. Hennessy, Daivd A. Patterson, Title: Computer Architecture A Quantitative Approach (3rd Edition), Publisher: Morgan Kaufman, Published in 2002 Relevant Section: Chapter 4.7.*

* cited by examiner

*Primary Examiner*—Tonia L Dollinger
(74) *Attorney, Agent, or Firm*—Lisa K. Jorgenson; James H. Morris

(57) ABSTRACT

A very long instruction word processor with sequence control. During each cycle the processor generates control signals to functional units based on the values in fields of an instruction. Each instruction may include an iteration count specifying the number of cycles for which the control signals should be generated based on that instruction. The instruction set further includes flow control instructions allowing for repetitive execution of a single instruction, repetitive execution of a block of instructions or branching within a program. Such a processor is illustrated in connection with a disk controller for a hard drive of a computer. The flexible sequencing allows a hard-drive controller to be readily reprogrammed for use in connection with different types of media or to be dynamically reprogrammed upon detection of a disk read error to increase the ability of the disk controller to recover data from a disk.

21 Claims, 6 Drawing Sheets

EFFICIENT AND FLEXIBLE SEQUENCING OF DATA PROCESSING UNITS EXTENDING VLIW ARCHITECTURE

BACKGROUND OF INVENTION

1. Field of Invention

This invention relates generally to very long instruction word processors and more specifically to flow control of instructions executed in a very long instruction word processor.

2. Discussion of Related Art

Processors are well known and widely used in many applications. A processor with a scalar architecture fetches an instruction and data for the instruction each time the instruction is executed. In executing a loop that requires an instruction be executed multiple times, a processor with a scalar architecture will fetch the instruction multiple times.

Some processors employ vector architectures. A vector architecture allows the processor to fetch an instruction once and then execute it multiple times with different data. In applications with relatively large loops, the total time required to execute a program can be reduced because each instruction needs to be fetched only once per loop. Vector architectures have been generally limited to high end processors used in supercomputers and other computation intensive applications because they require significant space on a semiconductor die on which the processor may be implemented.

Some scalar processors have been adapted to execute multiple operations for one fetch of an instruction. However, these processors have required that instructions specifying multiple operations be encoded in one instruction word. Such architectures proved difficult in practice to use. The instruction set for the processor needed to be expanded to accommodate many new instructions encoding multiple operations. In addition, making a complier that could identify patterns of instructions in a program that could be mapped to an instruction encoding multiple operations proved difficult.

Very Long Instruction Word (VLIW) processors are also known. In a VLIW processor, each instruction contains multiple fields. Each field contains a value that specifies control signals to be applied to a functional unit within the processor.

Disk drives have not previously included processors. Disk drives are used in many computer systems to store large amounts of information. FIG. 1 shows a disk drive 100 such as may be used in a conventional desktop computer. Disk drive 100 includes a disk platter 110. Disk platter 110 is the physical storage medium for disk drive 100.

Disk controller 105 controls the reading and writing of information on disk platter 110. Disk controller 105 also provides an interface to the computer or other system in which disk drive 100 is installed. Here, the portion of disk drive 100 that reads information from the disk is shown. A similar portion may be used to write information on the disk, but is not shown for simplicity.

Information is stored on the disk by altering a physical property of disk platter 110. For example, disk platter 110 may contain a coating that can be altered to produce a magnetic field. A bit of information is stored by altering a very small area of the coating to produce the magnetic field. A magnetic field sensed adjacent that area may indicate that a logical one has been stored in that area. Alternatively, the absence of a magnetic field adjacent that area may indicate a logical zero is stored.

Head 112 is positioned near the surface of disk platter 110. It contains a sensor that senses the magnetic field adjacent small areas of disk platter 110. The output of head 112 indicates what information has been stored in a specific area on the disk. In operation, disk platter 110 rotates so that head 112 passes over multiple areas and outputs a signal representing the sensed magnetic field over a series of areas on disk platter 110. Head 112 is controlled to move back and forth across the surface of the disk. In this way, any area of disk platter 110 may be brought under head 112. Motion of disk platter 110 and head 112 is synchronized so that the output of head 112 will represent, at a known time, values stored in a region of disk platters 110. Often, a disk drive is controlled to read multiple values at one time. The values read at one time are sometimes called a "sector."

Though information stored in disk drive 100 will generally be stored in digital form, head 112 outputs an analog signal. Disk controller 105 receives the output from head 112 and processes the analog signal to indicate the specific bits of information read from disk drive 100.

Disk controller 105 is here shown to contain a processing circuit 114 that includes a series of processing blocks $114_1$, $114_2 \ldots 114_N$ to process the output of head 112. Each of the processing blocks performs a function that is one step in the conversion of the analog signal sensed by head 112 to a stream of digital bits that represents information read from the disk. For example, one of the processing blocks $114_1$, $114_2 \ldots 114_N$ may perform a timing recovery function. Others may add a gain or offset or perform other operations to reliably read information from the disk platter 110.

In a conventional disk controller, each of the processing blocks is controlled by a state machine. Here, each processing block $114_1 \ldots 114_N$ includes a corresponding state machine $124_1, 124_2 \ldots 124_N$. Each of the state machines includes counters or registers that store values identifying a state. Each state machine $124_1, 124_2 \ldots 124_N$ includes logic circuitry that changes the current state of the state machine based on inputs or other factors. The logic circuitry also defines the outputs produced by the state machine in each state. The outputs of each state machine may control a processing block or another state machine. State machines may be designed to provide the desired level of control over each of the processing blocks $114_1, 114_2 \ldots 114_N$.

In normal operation, the output of processing block $114_N$ passes through a switching circuit 130 and is connected to a digital signal processing core (DSP) 120. When the chain of processing blocks $114_1, 114_2 \ldots 114_N$ provides sufficient processing to convert the analog signal from head 112 into a stream of digital values, DSP 120 serves simply as an interface to the computer system in which disk drive 100 is installed.

When the chain of processing blocks $114_1, 114_2 \ldots 114_N$ cannot reliably convert the analog signal read by head 112 into a stream of digital values, DSP 120 may control offline processing. DSP 120 is configured to receive values from each of the processing blocks $114_1, 114_2 \ldots 114_N$. DSP 120 may be programmed to attempt to recover a stream of digital values based on the outputs of each of the processing blocks. Alternatively, DSP 120 may control switch 130 to connect further processing blocks, such as processing block 116, to the chain of processing blocks in processing circuit 114.

Processing block 116 is controlled by a state machine 126 in the same way that processing blocks $114_1, 114_2 \ldots 114_N$ are controlled by corresponding state machines $124_1, 124_2 \ldots 124_N$. With processing block 116 connected through switch 130 to processing circuit 114, the signal read from disk platter 110 may be reapplied to processing circuit 114 for a second pass computation of digital values. Processing block 116 contains circuitry that is designed to augment the processing performed on the signal and therefore increase the chance that information can be reliably read from disk drive 100.

It would be desirable to provide an improved disk drive controller in particular and an improved processor in general.

SUMMARY OF INVENTION

In one aspect, the invention relates to a method of operating a processor of the type having a plurality of functional units. The method comprises providing an instruction having a plurality of fields. A number of iterations of the instruction are executed, each iteration comprising applying control signals to the plurality of functional units. The control signals are derived from a first portion of the plurality of fields. The number of iterations of the instruction is controlled based on data derived from a second portion of the plurality of fields.

In another aspect, the invention relates to a processor comprising a plurality of functional units, each having a control input. The processor also includes a sequencer having an instruction input with a plurality of fields and a plurality of control outputs. Each control output is coupled to a control input of a functional unit. The sequencer comprises a timing circuit having an output defining a plurality cycles and logic to generate, during a cycle, values of the control outputs in response to the values of a first portion of the plurality of fields of the instruction input. The sequencer also includes flow control logic comprising an iteration counter. The iteration counter is coupled to receive a value based on a value in a second portion of the plurality of fields of the instruction input. The flow control logic is coupled to the logic to generate values to control that logic to repeat the generated values during a number of cycles determined by the value received from the second portion of the plurality of fields of the instruction input.

A processor constructed or operated according to aspects of the invention may be used, for example, as a disk controller or to process very long instruction words.

In another aspect, the invention relates to a method of operating a disk controller. According to the method, a recording media is sensed to produce a signal. The signal is provided to a plurality of functional units, each having a control input. The plurality of functional units also has an output. An instruction is read from a memory and control inputs to the plurality of functional units are generated during at least a cycle of operation of the disk controller based on the instruction read from memory.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
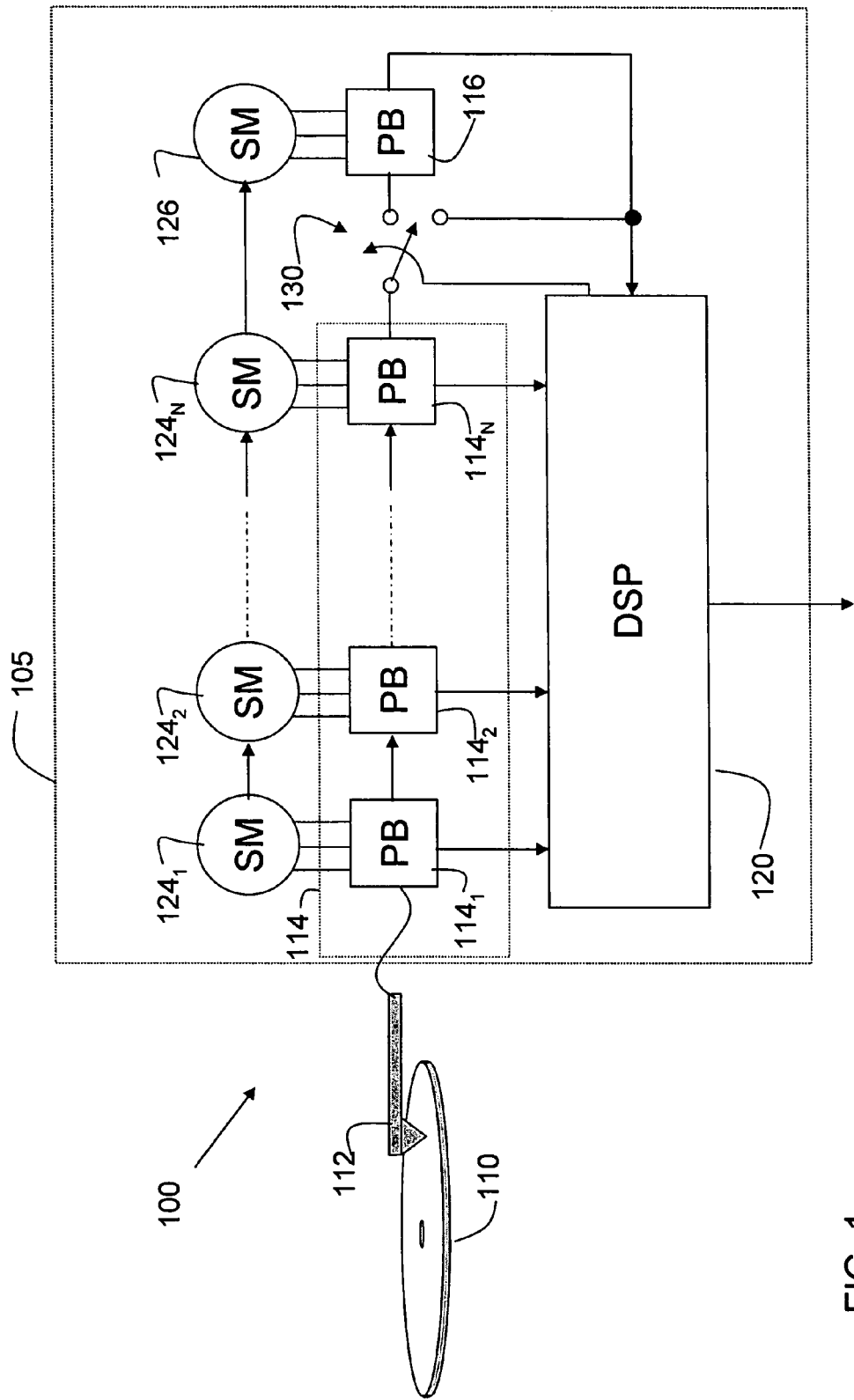
FIG. 1 is block diagram of a prior art disk controller.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Figure 2:
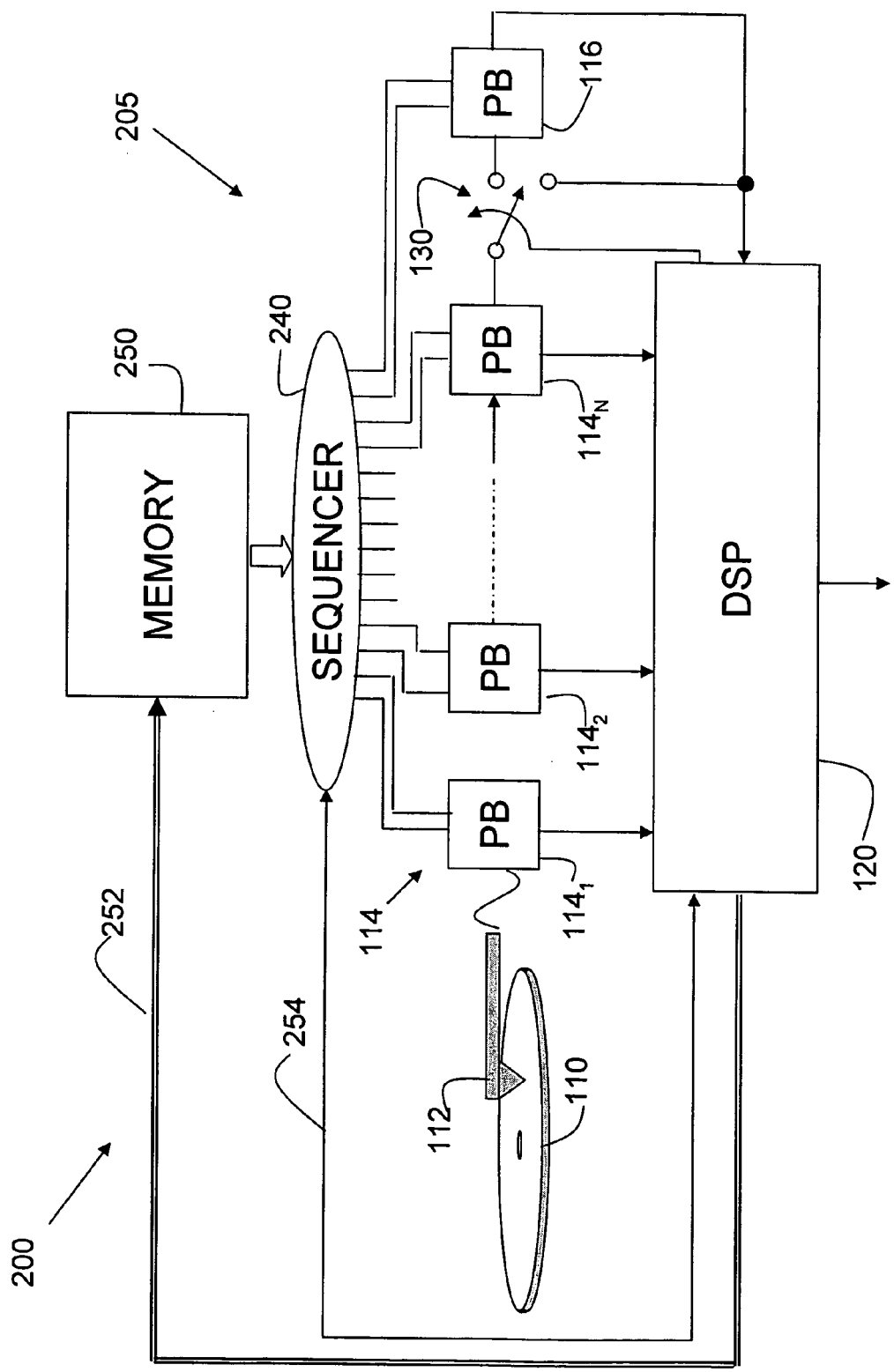
FIG. 2 is a block diagram of a disk controller according to the invention.

FIG. 2 shows a disk drive 200 with an improved control architecture. Disk drive 200 may include a disk controller 205 similar to disk controller 105 in the prior art. It may include the same signal processing circuitry. In the example of FIG. 2, disk controller 205 contains processing circuitry 114, switch 130, processing block 116 and DSP 120 as in the prior art. Here, though, DSP 120 is programmed or otherwise configured to control sequencer 240.

Disk controller 205 may be considered a special purpose processor. It includes a sequencer 240 that generates the control signals for each of the processing blocks $114_1$, $114_2 \ldots 114_N$ and processing block 116 by executing a series of instructions that forms a program. Disk controller 205 includes a program memory 250 to store the program. Program memory 250 is preferably a relatively high speed memory. For example, it may be SRAM, but any suitable volatile or non-volatile storage may be used. The size of memory 250 need not be a limitation on the invention. However, an advantage of the described embodiment is that memory 250 may be relatively small. Memory 250 may be 8 K bytes or less and may be around 1 K byte. Such a memory may be organized into words, such as 32 bit words.

Program memory 250 stores instructions that are fetched and then executed by sequencer 240. Each instruction may specify a function to be performed by sequencer 240, such as issuing control signals to each of the processing blocks within processing circuit 114 and processing block 116. The instructions in program memory 250 may also specify the flow of execution of the programs stored in memory 250.

Memory 250 is loaded with a program for sequencer 240 in any suitable manner. In FIG. 2, DSP 120 is shown connected to memory 250 through a bus 252. DSP 120 may, for example, load a program into memory 250 upon power up of disk drive 200. Alternatively, DSP 120 may change the program in memory 250 during operation of disk controller 205 to perform a second pass processing on a sector read from platter 110. The ability to change the program for sequencer 240 in this fashion gives a disk drive manufacturer significant flexibility in specifying offline processing of a sector that cannot be reliably read.

DSP 120 may load memory 250 with a program from a flash memory or other nonvolatile storage that is programmed during the manufacture of disk drive 200. In this way, significant flexibility is provided in manufacturing disk drives.

Figure 3A:
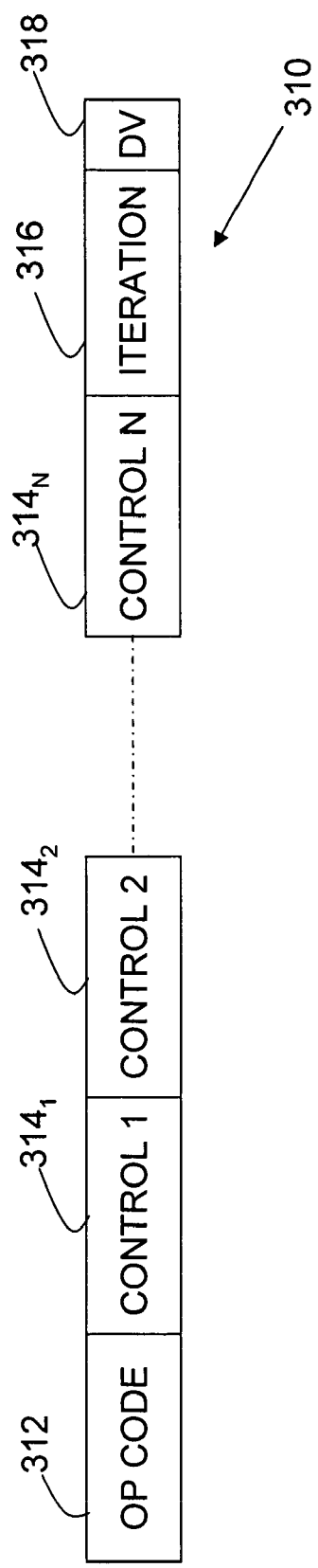
FIG. 3A is a sketch illustrating the format of an instruction controlling operation of functional units within the disk controller.
Figure 3B:
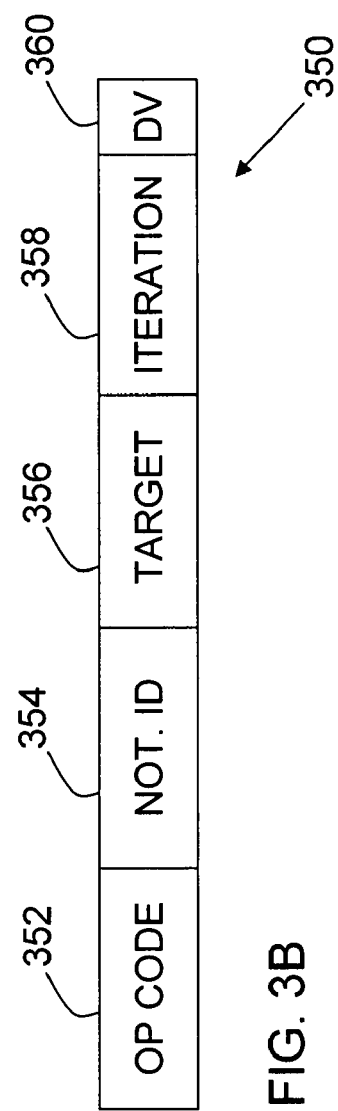
FIG. 3B is a sketch illustrating the format of a flow control instruction.

FIGS. 3A and 3B illustrate forms of instructions that may be stored in memory 250 to control sequencer 240. In the example, each instruction is stored in one word of memory 250. FIG. 3A gives an example of an instruction 310 that controls operation of functional units such as the processing blocks within processing circuit 114 and processing block 116. In this example, instruction 310 is in the form of a very long instruction word (VLIW) containing multiple control fields, each corresponding to one processing block. Function control instructions of the form shown in FIG. 3A may also control other aspects of processor operation, such as by specifying a block within memory 250 from which to read a program.

Instruction 310 contains an op code field 312. Op code field 312 contains a value indicating the operation to be performed by disk controller 205 when instruction 310 is executed. A different op code is assigned for each function to be performed by sequencer 240.

Instruction 310 includes multiple control fields $314_1$, $314_2 \ldots 314_N$. Each processing block within disk controller 205 may have associated with it one of the control fields. Upon execution of instruction 310, sequencer 240 may generate control signals to each of the processing blocks in accordance with the value in the corresponding control field $314_1, 314_2, \ldots, 314_N$.

Instruction 310 includes iteration count field 316. Iteration count field 316 contains a value indicating the number of times the instruction is repeated. This field may be used to cause sequencer 240 to assert control signals specified by the values in control fields $314_1, 314_2 \ldots 314_N$ for multiple successive instruction cycles.

Instruction 310 may include fields to control the timing at which the instruction is executed. For this purpose, instruction 310 may include a data valid field 318. Data valid field 318 may be a single control bit within instruction 310. When data valid field 318 is set logically high, sequencer 240 does not execute instruction 310 until valid data is available. Status line 254 allows DSP 120 to communicate status information to sequencer 240. For example, DSP 120 may assert status line 254 when head 112 is passing above the areas of disk platter 110 where data to be read is stored. In this way, a status signal on status signal line 254 may indicate that valid data is being provided to processing circuit 114.

FIG. 3B illustrates instruction 350 such as may be used for flow control. Functional unit control instructions in the form of instruction 310 and flow control instructions in the form of instruction 350 may have the same number of bits. Different types of instructions indicate that sequencer 240 may interpret different groupings of bits as different fields based on the function of the instruction. In a contemplated embodiment, each type of instruction uses the same group of bits to define the op code for the instruction. The op code controls how the remaining bits in the instruction are used by sequencer 240.

Instruction 350 includes the op code field 352. Op code field 352 stores a code indicating the function to be performed by disk controller 205 when instruction 350 is executed. Op code field 352 may be generally of the same form as op code 312. However, for a flow control instruction, the value in op code field 352 indicates a flow control operation. Branch operations are used herein as an example of a flow control operation. A processor may be constructed to process other op codes specifying additional flow control operations.

Instruction 350 includes a notification ID field 354. When the value in notification ID field 354 is non-zero, upon execution of the instruction 350, the value in notification ID field 354 is communicated to DSP 120 such as on status signal lines 254.

Instruction 350 includes a target address field 356. Target address field 356 holds a value indicating a target address. When instruction 350 is executed and it is determined that flow control is to be altered, the value in target address field 356 is used to determine the address of the instruction to which program flow should be diverted. A flow control instruction may cause a conditional or an unconditional branch in the program flow. Other fields in the instruction indicate the conditions under which the branch is to be taken.

The address in target address field 356 may be specified in any suitable way. The address may be an absolute address, indicating a specific address in memory 250. Alternatively, the target address may be specified as an offset relative to the start of a specific block within memory 250. As a further alternative, target address 356 may be a relative address, specifying a number of address locations prior to or subsequent to the memory location storing instruction 350.

Instruction 350 may include an iteration count field 358. The value in iteration count field 358 specifies the number of times the branch to the target address is taken before instruction 350 is deemed to be fully executed. In this way, instruction 350 may specify a block of code that is repeated multiple times. Where the notification ID field 354 contains a non zero value, the value is notified to DSP 120 upon completion of the number of iterations specified by iteration count field 358. A value may be "notified" to DSP 120 in any suitable way. For example, values in a control or status register read by DSP 120 may be set. As another example, the control or status lines connected to DSP 120 may be asserted.

Instruction 350 also includes a data valid field 360. As with instruction 310, the data valid field 360 indicates whether sequencer 240 should wait to execute instruction 350 until valid data is being provided to processing circuit 114. If data valid field 360 is set and no valid data is being provided, sequencer 240 performs no action until valid data is provided. While waiting for valid data, sequencer 240 may disable all sequencer outputs or otherwise place them in an indeterminate state.

Figure 4:
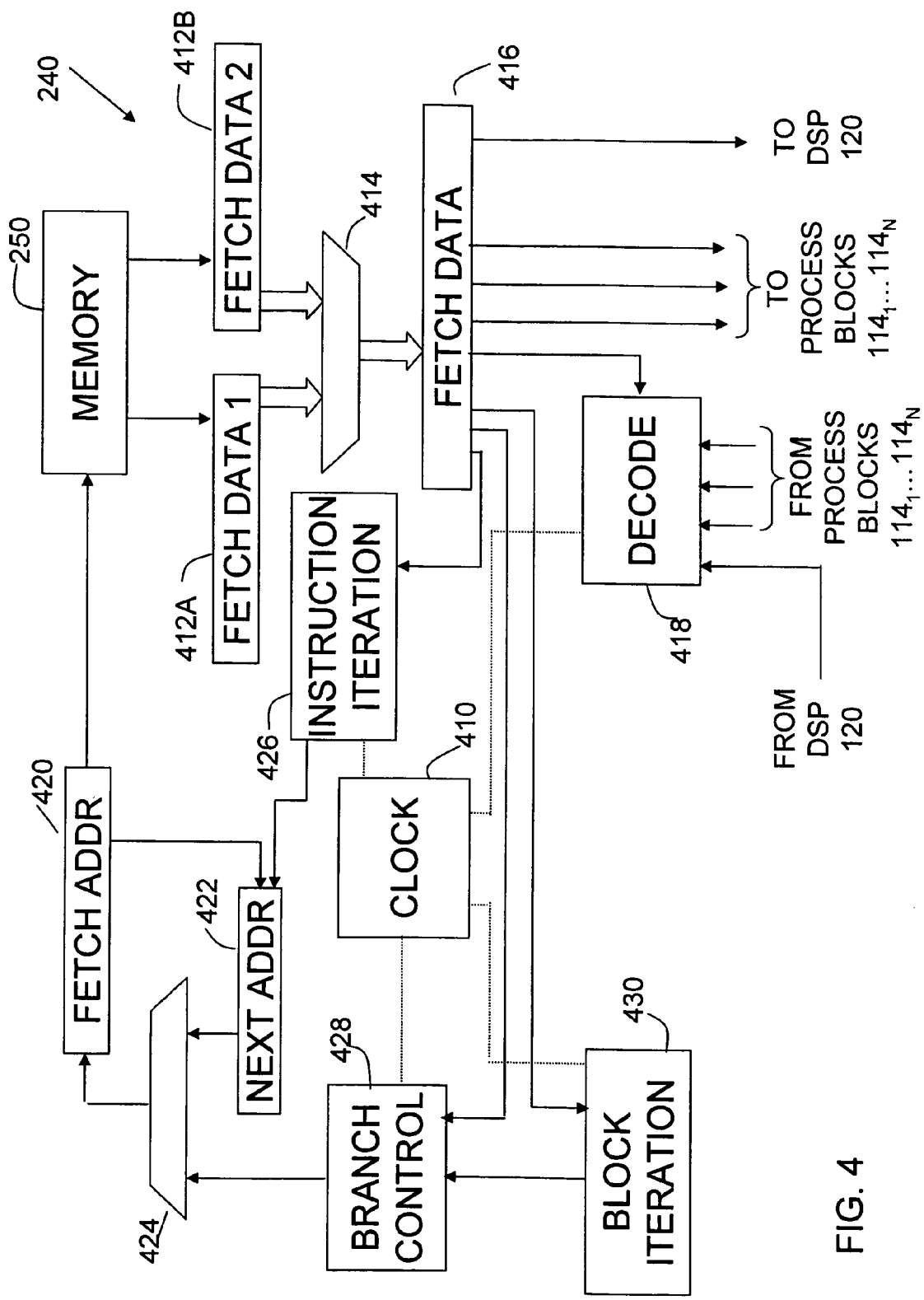
FIG. 4 is a block diagram of the sequencer of FIG. 2.

FIG. 4 shows sequencer 240 in more detail. Sequencer 240 may be implemented with techniques and circuits, whether now known or hereafter developed, similar to those used to build a microcontroller.

Sequencer 240 includes a clock circuit 410. Clock circuit generates timing signals. Other components of sequencer 240 synchronize their operation to these timing signals. In the example embodiments, sequencer 240 is a relatively high speed sequencer, executing instructions at a rate of at least 800 MHz. Clock circuit 410 generates clock signals with timing sufficient to execute instructions at this rate. Where multiple steps must be performed within an instruction cycle in order to execute one instruction, clock circuit 410 may generate multiple clock signals differing in phase. Specific clock signals are not expressly shown but may be of a form used for microcontroller design.

Sequencer 240 includes an address register 420. The value in address register 420 is applied to memory 250 to select the address in memory from which an instruction is to be read.

In the example of FIG. 4, sequencer 240 includes a two stage address pipeline. Addresses fetched from memory 250 are alternatively stored in pipeline register 412A or 412B. While the instruction in one of the pipeline registers 412A or 412B is being executed by sequencer 240, a value read from memory 250 may be loaded into the other.

Pipeline registers 412A and 412B are connected to multiplexer 414. Multiplexer 414 passes the value in one of the pipeline registers 412A or 412B through to its output. Multiplexer 414 is controlled to provide instructions fetched from memory 250 in the desired order.

The instruction selected by multiplexer 414 is provided to current instruction logic 416. Current instruction logic 416 holds the instruction being executed by sequencer 240. Current instruction logic 416 has output lines corresponding to the fields of each instruction. For example, lines running to process blocks $114_1 \ldots 114_N$ may couple the values in fields $314_1 \ldots 314_N$ to the corresponding process blocks. The values in notification ID field 354 may be coupled to DSP 120.

Additionally, values in other fields of an instruction may be coupled to other components within sequencer 240. For example, the value in op code field 312 may be coupled to decode logic 418. The value in iteration count field 316 may be coupled to instruction iteration control circuit 426. The value in iteration count field 358 may be coupled to block iteration control circuit 430. The value in target address field 356 may be coupled to branch control circuit 428.

Current instruction logic 416 may contain processing circuitry to either control the timing at which values are provided to the destination circuits or to alter the values provided. For example, sequencer 240 may be constructed to execute instructions during which sequencer 240 does not generate control signals to any of the process blocks. To accommodate such a function, circuitry may be included to selectively set the values on the lines coupled to process blocks $114_1 \ldots 114_N$ and 116 to values that do not alter the operation of process blocks $114_1 \ldots 114_N$ and 116. Alternatively, a particular instruction may cause a reset of process blocks $114_1 \ldots 114_N$ and 116. To execute a reset instruction, it may be desirable to have current instruction logic 416 generate control values to process blocks $114_1 \ldots 114_N$ and 116 that cause each of the process blocks to reset.

As a further example of the processing that could be performed by current instruction logic 416, the described embodiment corresponds to a non-encoded VLIW format. Bits in the fields in the instruction words correspond directly to control signals generated for processing blocks that are controlled by the processor. Fields may be encoded—meaning that each pattern of bits in one or more fields corresponds to a specific pattern of control values that needs to be generated. More control values are generated than there are bits in the field. It may be desirable to include circuitry that can decode any encoded portions of an instruction to create one bit for each control value to be applied to the processing blocks or other components of the system controlled by sequencer 240.

The op code of the instruction in current instruction logic 416 is applied to decode logic 418. The value of the op code signifies the operation sequencer 240 is to perform. When the instruction is executed, decode logic 418 generates values on control lines connected to components of sequencer 240, which causes the components to perform the desired operation. For example, when the op code indicates the instruction is a function control instruction in the form of instruction 310, control signals from decode logic 418 may cause instruction iteration control circuit 426 to load an iteration count. In contrast, when the op code specifies a flow control instruction in the form of instruction 350, decode logic 418 may cause block iteration control circuit 430 to load an iteration count. Decode logic may be implemented as a lookup table or in any other suitable way.

Decode logic 418 also receives from current instruction logic 416 the data valid fields such as 318 and 360. In addition, decode logic 418 receives as an input a status signal from DSP 120. The status signal may indicate, for example, whether the disk controller 205 is receiving valid data from read head 112. Decode logic 418 may generate appropriate control signals in response to these inputs. Where the inputs indicate that the current instruction is to be executed only when valid data is being provided but no valid data is being provided, decode logic 418 may generate values on all the control lines to stall operation of sequencer 240. In other cases—either when the data valid field of the instruction indicates it should be executed regardless of whether valid data is being read from the disk or when valid data is being provided—decode logic 418 may issue the control signals necessary to control the components of sequencer 240 to perform the desired operation. Decode logic 418 is connected to other components of sequencer 240 by control lines.

For example, control lines may be connected to current instruction logic 416 to signal that a certain bits in the instruction be treated as control fields $314_1 \ldots 314_N$ and applied to control the processing blocks. Control lines may also be connected to instruction iteration control circuit 426 or block iteration control circuit 430 to signify that the values in iteration count fields 316 or 358, respectively, be stored. The control lines are not expressly shown in FIG. 4, but may be implemented in any suitable way.

Sequencer 240 also includes address generation circuitry. In operation, instructions are fetched from memory 250 and executed. Address register 420 stores the address of an instruction to be read from memory. The address stored in address register 420 may be replaced each cycle by a new value provided through multiplexer 424.

In the embodiment of FIG. 4, sequencer 240 is configured to select the next address in one of three ways. The specific way used in any cycle is based on programming of sequencer 240. In a sequential mode of operation, instructions are fetched in the order in which they are stored in memory. In this mode, multiplexer 424 couples the value from next address circuit 422 into current instruction address register 420. Next address circuit 422 receives an input from current instruction address register 420 and adds a predetermined amount to it. In sequential execution mode, the amount added represents the difference between addresses that store successive instructions within memory 250.

Sequencer 240 may also be programmed to operate in an instruction iteration mode in which multiple iterations of an individual instruction are performed. Instruction iteration mode is used when an instruction in the form of instruction 310 is processed. The value in iteration count field 316 is loaded into instruction iteration control circuit 426. Instruction iteration control circuit 426 provides a control signal to next address circuit 422. When this control signal is asserted, next address circuit 422 adds zero to the value in current instruction address register 420. The address for the next instruction to be fetched is therefore the same as the current instruction and the same instruction is repeated. Instruction iteration control circuit 426 tracks the number of iterations for which the address is the same. When the number of fetches of the same instruction equals the value in iteration count field 316, the control signal to next address circuit 422 is de-asserted and fetches may continue for sequential execution of instructions.

Sequencer 240 may also operate in a block iteration mode in which multiple iterations of a block of instructions is performed. Block iteration mode is programmed using a flow control instruction in the form of instruction 350 with a value greater than one in iteration count field 358. During the first iteration of such an instruction, the value in iteration count field 358 is loaded into block iteration control circuit 430. The target address is also loaded into branch control circuit 428. If the target address is other than an absolute address, branch control circuit 428 computes the required absolute address and provides it through multiplexer 424 to address register 420.

When a flow control instruction is executed, decode logic 418 controls multiplexer 424 to select its input from branch control circuit 428. Control signals may also be generated to cause sequencer 240 to ignore the pre-fetched instructions stored in pipeline register 412A or 412B when a flow control operation is executed.

Block iteration control circuit 430 tracks the number of times a flow transfer instruction is executed while in block iteration mode. When the number of iterations specified in the iteration count field 358 of the instruction have been performed, block iteration control circuit 430 may generate control signals that cause multiplexer 424 to select the next address from next address circuit 422 rather than executing the branch a again.

When the flow control instruction includes a non-zero value in notification ID, this value may also be sent to DSP 120 at the final iteration of the instruction. As shown in FIG. 4, the status signals to DSP 120 are issued by current instruction logic 416. However, various hardware configurations may implement this feature. For example, block iteration control circuit 430 may, upon execution of the final iteration of the loop, send a status signal to current instruction logic 416, triggering the notification to DSP 120. As one possible alternative construction, the notification ID value could be transmitted from current instruction logic 416 to block iteration control circuit 430 where in can then be transmitted upon the completion of the last iteration of a loop.

Figure 5A:
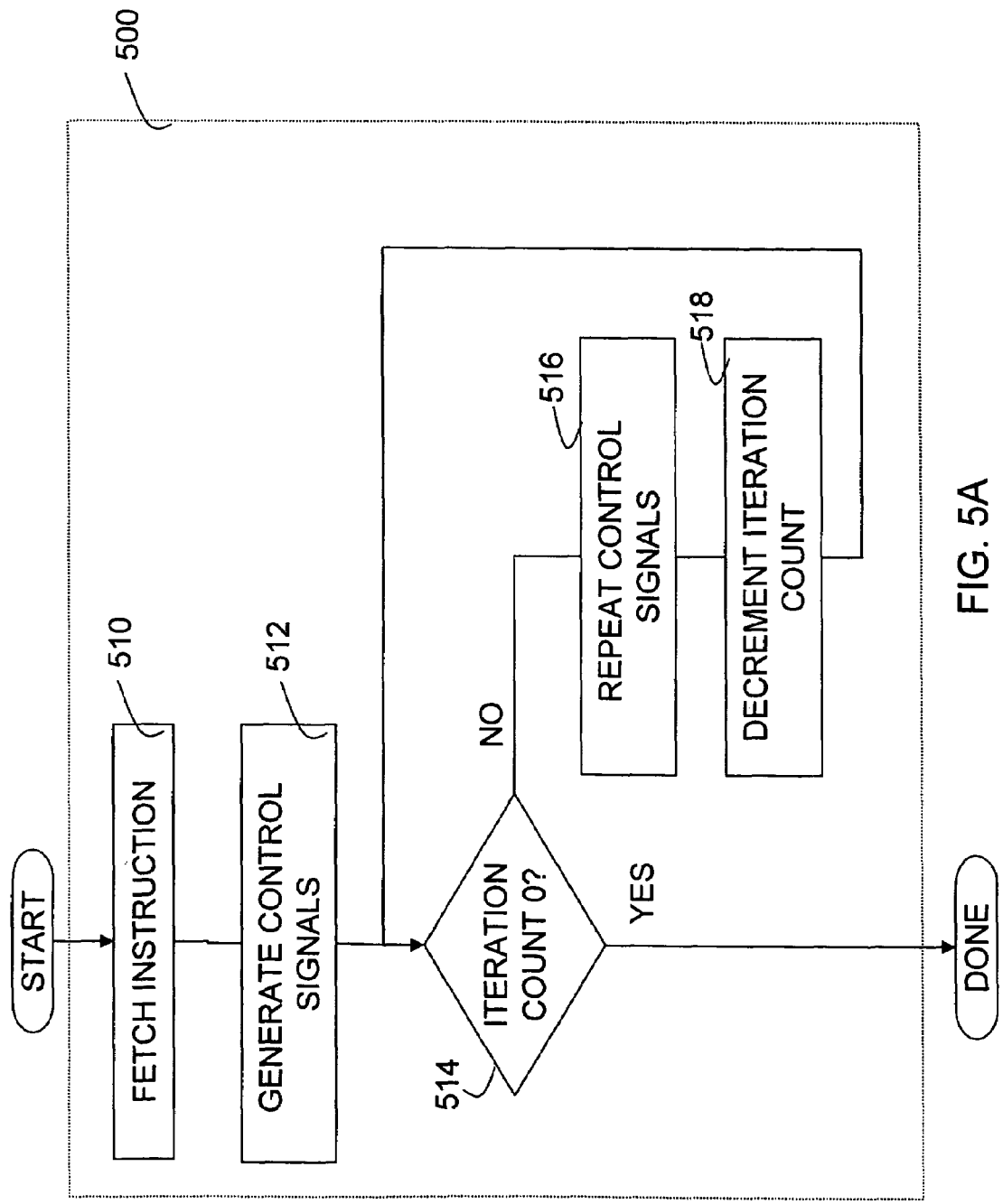
FIG. 5A is a flow chart useful in understanding the operation of the sequencer of FIG. 2 when executing a repeating instruction.

FIG. 5A shows a process of executing a function control instruction in the form of instruction 310 (FIG. 3A) that may be performed with sequencer 240 as illustrated in FIG. 4. At block 510, an instruction is fetched. Based on the fetched instruction, control signals are generated at step 512. The control signals may control processing blocks within the disk drive controller 205 or may control other circuitry as specified in the control fields $314_2$, $314_2$ . . . $314_N$ of the instruction At decision block 514 a determination is made whether the instruction has been executed the required number of times. If the instruction has been executed the number of times specified by iteration count field 316, execution of the instruction finishes. Alternatively, where it is determined at decision block 514 that the instruction has not been executed the required number of times, processing proceeds to block 516.

At block 516, control signals as specified in the fields $314_1$, $314_2$ . . . $314_N$ of the instruction are again generated.

At block 518, the iteration count is decremented. At decision block 514, this iteration count is used to determine whether the instruction has then been executed the required number of times. When the instruction is executed the required number of times, execution of the instruction is finished. When the instruction has not been executed the required number of times, the process will continue by repeating the processes in blocks 516 and 518 until the instruction has been executed the required number of times.

Figure 5B:
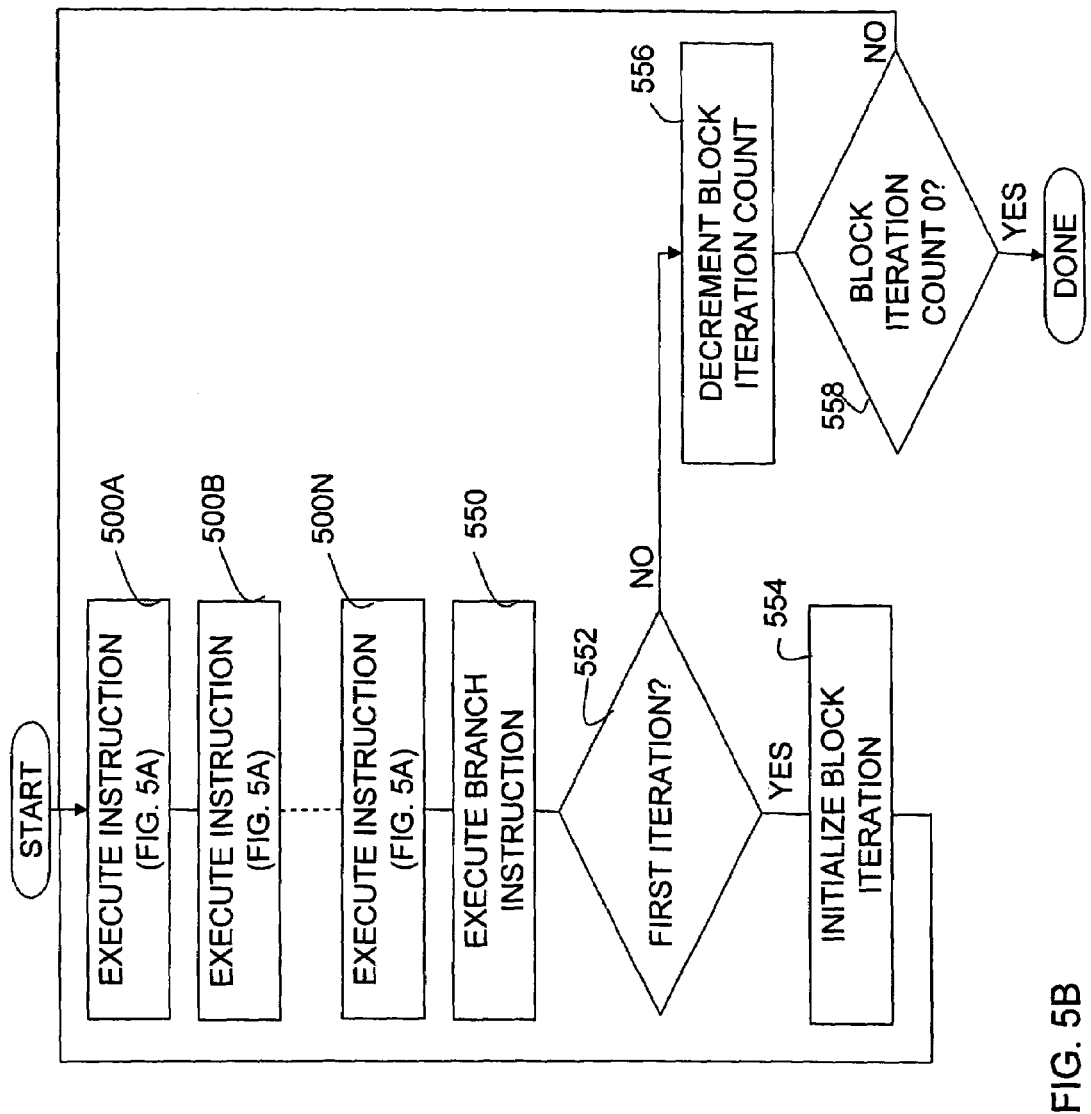
FIG. 5B is a flow chart useful in understanding the operation of the sequencer of FIG. 2 when executing a repeating block of instructions.

FIG. 5B shows a more complex process that may be performed by providing sequencer 240 with the program that uses function control instructions in the form of instruction 310 (FIG. 3A) and flow control instructions in the form of instruction 350 (FIG. 3B). The process in FIG. 5B begins at block 500A. At block 500A, an instruction in the form of instruction 310 may be fetched and executed as described in FIG. 5A. Multiple such instructions may be fetched and executed. In the example of FIG. 5B, execution of multiple such instructions is illustrated at blocks 500A, 500B and 500N.

The end of the block of code to be executed in the loop is indicated by a branch instruction. Block 550 indicates that the branch instruction is executed. At decision block 552, the process branches based on whether one or more than one iteration of the branch instruction has been executed. In the first iteration, processing proceeds to block 554. At block 554, the circuitry within sequencer 240 that controls block iteration is initialized. Initialization may take the form of loading the value from iteration count field 358 in the branch instruction into block iteration control circuit 430 and loading the target address into branch control circuit 428. Once sequencer 240 is initialized for executing a block of code in a loop, execution resumes at the top of the loop as specified by the target address.

In subsequent iterations through the loop, processing is diverted at decision block 552 to process block 556. At process block 556, an iteration count is decremented. If, as determined at decision block 558, the iteration count has not been decremented to zero, the block of code is again executed by looping back to process block 500A.

Alternatively, where the iteration count has been decremented to zero, indicating the block of code has been executed the required number of times, execution of the loop is finished.

FIGS. 5A and 5B illustrate significant flexibility that can be obtained with a sequencer 240 according to the invention. Individual instructions or groups of instructions may be executed multiple times. The number of times that each instruction or each block of code is executed may be changed by simply changing a programmed value in one of the instructions stored in memory 250. Such flexibility may be important, for example, when sequencer 240 controls a disk drive as shown in FIG. 2.

Such flexibility may be employed to allow a disk drive to store more information on disk platter 110 if the physical media will accept the information. For example, a conventional disk drive stores information in sectors. Each sector contains a number of preamble bits followed by a sync mark and then data for the sector. The number of preamble bits must be sufficient to allow the disk drive controller to recover the clock signal from the information read from the disk. As the quality of the disk platter decreases, the signal to noise ratio of the signal read from the disk platter likewise decreases. To compensate, additional preamble bits are required to reliably recover the data clock. Being able to reprogram sequencer 240 allows the number of preamble bits to be reduced for any disk drive having a disk platter capable of generating signals with relatively high signal to noise ratio. Such a change may be made for an entire product line if, for example, a manufacturing change results in a higher quality disk platter. Alternatively, individual disk drives may be programmed based on quality testing of the disk platters. Those with higher signal to noise ratios may be programmed to use fewer preamble bits and therefore store more data. Disk drives manufactured in this way may then be binned based on the total amount of information they can store.

Alternatively, as better algorithms to extract digital data from a signal read by read head 112 are developed, disk drives taking advantage of these new algorithms may be constructed without modifying any hardware in disk controller 205 by simply changing the program executed by sequencer 240.

Sequencer 240 may be constructed with an instruction set suited for operating disk controller 205. For example, an op code may be assigned to an IDLE instruction. Upon execution of an IDLE instruction, sequencer 240 may assert a status line signaling to DSP 120 that it has completed execution of a program. An IDLE instruction may be included at the end of each program written for sequencer 240.

Other status instructions may also be included in the instruction set. Sequencer 240 may be constructed to provide the desired operation for each of these instructions. For example, it may be desirable to design sequences 240 based on the intended operation for an instruction that has an op code indicating that a status signal should be sent to DSP 120 when the instruction is executed and also an iteration count field set to indicate the instruction should be executed multiple times. Executing such an instruction may, for example, result in the status signal being asserted each time the instruction is executed. Alternatively, the status signal may be asserted only for the first iteration of the instruction or only for the last iteration of the instruction. In one contemplated embodiment, the status signal is asserted after the last iteration.

Further, conditional instructions may be provided. When a conditional instruction is executed, the function performed may depend on either the state of circuitry within disk controller 205 or the state of status signals provided as inputs to disk controller 205. An example of such an instruction is a Sequence Detect Timeout (SDTO). Such an instruction may include bits in the control fields $314_1 \ldots 314_N$ that configure the processing blocks to monitor the stream of values being processed to identify a bit pattern that represents a synchronization mark (or other sequence) used to identify the start of a sector of data.

The iteration control field for such an instruction may be set so that the instruction is executed multiple times. Such an instruction would therefore cause sequencer 240 to wait until the desired sequence is detected by a processing block. A status line from a processing block may signal to sequencer 240 that the sequence has been detected. Such a status line could, for example, be provided to instruction iteration control circuit 426, causing it to issue control signals to next address circuit 422 that moves execution to the next instruction in memory.

In one embodiment, if an SDTO instruction is executed the number of times specified in the iteration count, an abnormal operating condition is indicated. Thus, upon completion of the required number of iterations for such an instruction, the sequencer may generate a status signal indicating that the synchronization signal was not detected. In this scenario, sequencer 240 may enter a state similar to what would result when the IDLE instruction is executed.

Such instructions may be combined to form a program for sequencer 240. For example, the program may start with an instruction that resets the processing blocks. The next instruction may have its data valid field 318 set. Such an instruction causes sequencer 240 to wait until data is available. The program may then contain instructions to cause disk controller 205 to issue control signals to the processing blocks so that the processing blocks convert a signal from head 112 to a sector of digital data. The program may specify multiple iterations of instructions or blocks of instructions in the program, as desired, including instructions that cause the process to repeat for subsequent sectors to be read.

If DSP 120 does not receive valid data, it may change the program in memory 250, causing sequencer 240 to execute a different program. DSP 120 may change the program to one better suited to recovering data from a signal with low signal to noise ratio. For example, such a program could contain instructions that configure processing block 116 to be used in the data processing. Such a program could be developed and loaded into disk controller 205 in much the same way programs are developed for microcontrollers. An assembler and other development tools could be used. The development tools could include a debugger.

Sequencer 240 may be constructed with features that support debugging of programs developed to run on sequencer 240. A simple form of debugging may be achieved without explicit hardware debug support simply by loading short programs in memory 250 and observing the result. For greater debugging capability, sequencer 240 may be constructed with a debug mode. In debug mode, sequencer 240 may be clocked such that instructions are executed one at a time, with each execution initiated by a command from some external device, which could be DSP 120 or some external debugging controller.

Because instruction iterations and block iterations are possible, multiple behaviors are possible. Sequencer 240 could be constructed to treat each iteration of an instruction as one step while in debug mode. Alternatively, one step in debug mode could be full execution of all iterations of an instruction or a block of instructions. Alternatively, the processor could be designed to support any of the above behaviors by providing it with multiple debug modes.

Further debug features could be provided by making registers in sequencer 240 accessible to DSP 120 or other debugging controller so that values may be read or written to them. In cases were DSP 120 includes debug support, the registers in sequencer 240 are preferable accessible in the same way that the registers in DSP 120 are available for debug.

Having thus described several aspects of at least one embodiment of this invention, it is to be appreciated various alterations, modifications, and improvements will readily occur to those skilled in the art.

For example, a processor with an improved design is illustrated as used in a disk drive controller. A processor according to the invention may be used in other applications. Other electronic devices constructed from multiple functional units may be controlled by a sequencer as described.

The invention is not limited to use in connection with functional units that perform discrete operations in one process. A functional unit may be any hardware structure for which control is desired. Also, it is described that functional units are controlled by instructions in the form of instruction 310 and program flow is controlled by instructions in the form of instruction 350. Flow control and functional unit control fields may be provided in the same instructions.

As a further example, sequencer 240 is shown to contain two pipeline stages. The number of pipeline stages is not critical to the invention. It is not necessary that sequencer 240 be a pipelined processor. Alternatively, sequencer 240 may contain more than two pipeline stages.

Also, sequencer is illustrated as having one block iteration control circuit. This microarchitecture could be modified to support nested loops.

Further, the invention is described in conjunction with a disk that contains a magnetic recording media. The disk controller described above may be employed with disks using optical or other recording media.

Such alterations, modifications, and improvements are intended to be part of this disclosure, and are intended to be within the spirit and scope of the invention. Accordingly, the foregoing description and drawings are by way of example only.

What is claimed is:

1. A disc controller adapted to generate a digital value representative of information stored on a disc by processing a signal derived by sensing a physical property of the disc, the disc controller comprising a processor comprising:
   a) a plurality of functional units, each having a control input and each being adapted and configured to perform a function on the signal in accordance with a value at the control input; and
   b) a sequencer having an instruction input with a plurality of fields, each field capable of having a value, and a plurality of control outputs, each control output coupled to a control input of a functional unit, the sequencer comprising:
      i) a timing circuit having an output defining a plurality of cycles;
      ii) logic to generate, during a cycle, values of the control outputs in response to the values of a first portion of the plurality of fields of the instruction input; and
      iii) flow control logic comprising an iteration counter capable of having a value, the iteration counter coupled to receive a value based on a value in a second portion of the plurality of fields of the instruction input, the flow control logic coupled to the logic to generate values to control the logic to generate values to repeat the generated values of the control outputs during a number of cycles determined by the value received from the second portion of the plurality of fields of the instruction input.

2. The disc controller of claim 1, wherein the sequencer is pipelined and the logic to generate, during a cycle, values on the control outputs in response to the values of a first portion of the plurality of fields of the instruction input generates values of the control outputs in response to the values of a first portion of the plurality of fields of the instruction input during a prior cycle.

3. The disc controller of claim 1, wherein the processor is a very long instruction word processor.

4. The disc controller of claim 1, wherein:
   a) the processor additionally comprises
      i) a memory having an address input;
      ii) an address register having an address input and an address output coupled to the address input of the memory; and
   b) the sequencer additionally comprises:
      i) second flow control logic having a block iteration counter capable of having a value;
      ii) branch control circuit, the branch control circuit having an address output; and
      iii) a switching circuit coupled to the branch control circuit, the block iteration counter and the address register, the switching circuit adapted to selectively couple the address output of the branch control circuit to the address input of the address register in response to the iteration counter having a value in a predetermined range.

5. The disc controller of claim 4, additionally comprising a loading circuit having a control input, the loading circuit coupled to a first field of the instruction input and the block iteration counter, the loading circuit adapted to selectively couple the value of the first field to the block iteration counter in response to a value at the control input of the loading circuit.

6. The disc controller of claim 5, additionally comprising a decoder having an op code input coupled to a second field of the instruction input, the decoder having a control output coupled to the control input of the loading circuit, the decoder setting the value at the control output in response to a value at the op code input.

7. The disc controller of claim 1, wherein the plurality of functional units are interconnected in series and the signal is coupled to a first of the functional units.

8. The disc controller of claim 7, additionally comprising a digital signal processor.

9. The disc controller of claim 8, additionally comprising a memory having a plurality of locations, each storing an instruction; and
a bus interconnecting the digital signal processor and the memory.

10. The disc controller of claim 8, wherein the digital signal processor and the plurality of interconnected functional units form a very long instruction word processor.

11. A method of operating a disc controller comprising:
   a) sensing recording media to produce a signal representative of a physical property of the recording media;
   b) providing the signal to a plurality of functional units, each functional unit performing a function on the signal and each having a control input, the plurality of functional units having an output;
   c) reading a plurality of instructions from a memory;
   d) generating control inputs to the plurality of functional units during at least a first cycle of operation of the disc controller based on a first instruction of the plurality of instructions read from memory; and
   e) generating control inputs to the plurality of functional units during at least a second cycle of operation of the disc controller based on a second instruction of the plurality of instructions read from memory, the second instruction being selected based on at least one other instruction in the plurality of instructions; and
   f) generating at the output of the plurality of functional units a digital value representative of information stored on the recording media, the digital value being derived through processing the signal within the plurality of functional units in accordance with at least the first instruction and the second instruction.

12. The method of operating a disc controller of claim 11, wherein generating control inputs to the plurality of functional units during at least a the first cycle of operation comprises generating control inputs to the plurality of functional units during a number of successive cycles of operation of the disc controller, with the number of cycles determined based on the value of a field of the first instruction.

13. The method of operating a disc controller of claim 11, wherein:
   a) plurality of instructions forms a block of instructions;
   b) the method further comprises executing the instructions in the block of instructions a number of times, wherein a third instruction in the block of instructions comprises a field storing a block iteration count and the number of times the instructions in the block are executed is based on the iteration count.

14. The method of operating a disc controller of claim 11, further comprising changing the instructions stored in the memory.

15. The method of operating a disc controller of claim 11, additionally comprising asserting a control signal correlated to a signal produced from sensing a region of the recording media in which data to be read is stored and the act of generating control inputs is delayed until the control signal is asserted.

16. The method of operating a disc controller of claim 11, wherein sensing recording media to produce a signal comprises sensing a region of the recording media to produce a signal representing data stored in a region of the disc, and the plurality of instructions comprises a first program, and the method additionally comprises:
   a) determining that the output of the plurality of interconnected functional units does not adequately represent data stored in the region of the disc; and
   b) processing a signal representing data stored in the region of the disc in the plurality of interconnected functional units while executing a second program.

17. The method of operating a disc controller of claim 11, wherein generating control inputs to the plurality of functional units during at least a first cycle of operation comprises configuring the plurality of functional units to detect a predetermined sequence in the signal.

18. The method of operating a disc controller of claim 17, wherein the predetermined sequence is a synchronization mark and generating control inputs to the plurality of functional units during at least a first cycle of operation comprises generating the same control inputs for a predetermined number of cycles or until the synchronization mark is detected.

19. The method of operating a disc controller of claim 18, further comprising selecting instructions in the plurality of instructions based on whether the synchronization mark was detected before the predetermined number of cycles.

20. The method of operating a disc controller of claim 14, wherein the plurality of instructions comprise a first program adapted to control the disc controller to access data on the recording media using a first number of preamble bits per sector and changing the instructions stored in memory comprises loading a second program adapted to control the disc controller to access data on the recording media using a second number of preamble bits per sector.

21. A method of operating a disc controller comprising:
   a) sensing recording media to produce a signal representative of a physical property of the recording media;
   b) providing the signal to a plurality of functional units, each functional unit performing a function on the signal and each having a control input, the plurality of functional units having an output;
   c) reading a plurality of instructions from a memory;
   d) generating control inputs to the plurality of functional units during at least a first cycle of operation of the disc controller based on a first instruction of the plurality of instructions read from memory; and
   e) generating control inputs to the plurality of functional units during at least a second cycle of operation of the disc controller based on a second instruction of the plurality of instructions read from memory, the second instruction being selected based on at least one other instruction in the plurality of instructions,
wherein the first instruction specifies a control input for a first subset of the plurality of functional units and the second instruction specifies a control input for a second subset of the plurality of functional units, the second subset containing more functional units than the first subset, and the generating control inputs based on the second instruction occurs conditionally in response to an inability to read data from the recording media following execution of the first instruction.

* * * * *